United States Patent [19]

Wong

[11] Patent Number: 5,131,158

[45] Date of Patent: Jul. 21, 1992

[54] GAUGE FOR VALIDATING THE CALIBRATION OF A LOOP

[75] Inventor: Johnson N. S. Wong, Rolling Hills, Calif.

[73] Assignee: Evergreen Industries, Inc., Long Beach, Calif.

[21] Appl. No.: 718,172

[22] Filed: Jun. 20, 1991

[51] Int. Cl.⁵ .................................. G01B 3/00
[52] U.S. Cl. .................... 33/501.45; 33/562; 33/555.1
[58] Field of Search ............ 33/501.45, 501.05, 562, 33/679.1, 555.1

[56] References Cited

U.S. PATENT DOCUMENTS

| | | | |
|---|---|---|---|
| 187,938 | 2/1877 | Towsey | 33/679.1 X |
| 337,224 | 3/1886 | Albert | 33/562 |
| 648,390 | 5/1900 | Coe | 33/567 X |
| 2,375,945 | 5/1945 | Redmer | 33/501.45 |
| 2,493,233 | 1/1950 | Dower | 33/501.45 |

OTHER PUBLICATIONS

SWALM Newsletter (1989).

*Primary Examiner*—Harry N. Haroian
*Attorney, Agent, or Firm*—Robbins, Dalgarn, Berliner & Carson

[57] ABSTRACT

A gauge for validating the inner diameter and thickness of a calibrated loop. The gauge preferably has a long handle, a cylindrical member at each end of the handle and a slot at each end of the handle. The cylindrical members have slightly different outside diameters for attempted insertion into the loop to be validated and the slots have slightly different widths for attempted insertion of the loop therein. Identifying indicia are imprinted on the handle to indicate which end is which.

11 Claims, 1 Drawing Sheet

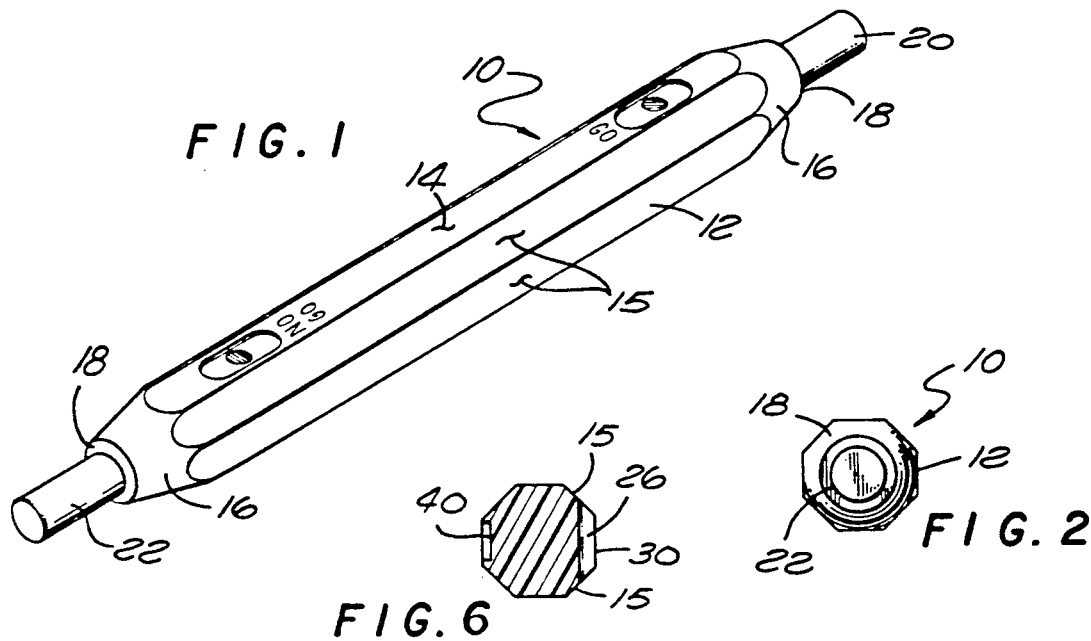
FIG. 1
FIG. 6
FIG. 2
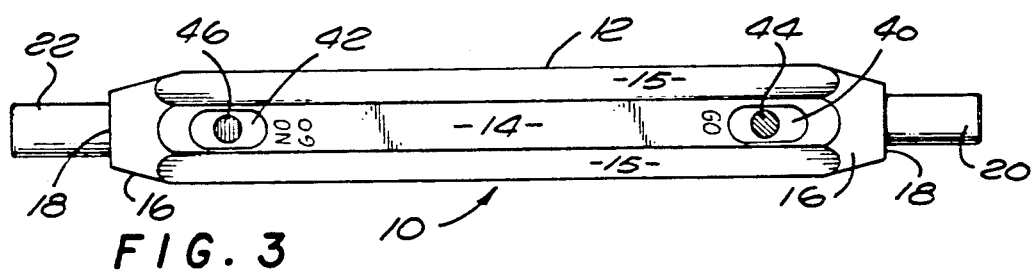
FIG. 3
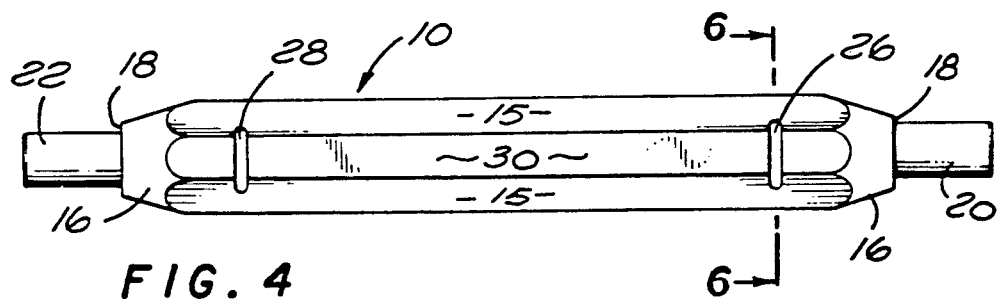
FIG. 4
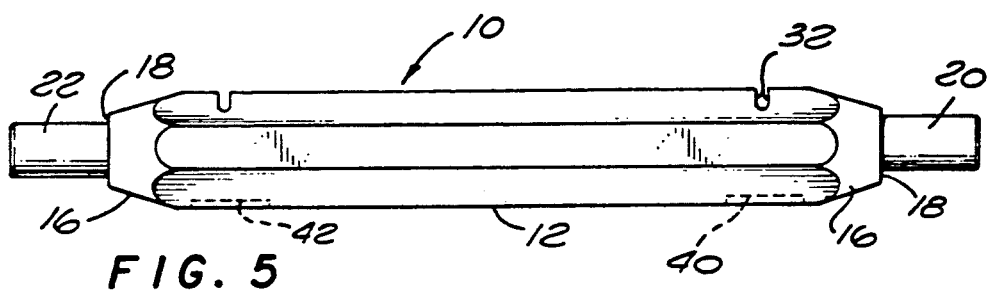
FIG. 5

GAUGE FOR VALIDATING THE CALIBRATION OF A LOOP

FIELD OF THE INVENTION

This invention relates to gauges for verifying the shape and size of a loop and, in particular, a gauge that validates the inside diameter and thickness of a calibrated disposable inoculating loop.

BACKGROUND OF THE INVENTION

The inoculating loop is a vital piece of equipment in the quantitation of urine and other cultures. The loop must deliver a precise volume of liquid and accordingly must be subject to rigorous quality control to ensure that the volume of delivery is accurate. Any deformity or irregularity in the loop may affect its volume capacity.

Many manufacturers and larger laboratories typically use the Evans Blue Dye method to validate the calibration of metal loops. Significant time is required, however, to prepare the required dye solution, to measure the optical density of several known volumes of dye using pipettes and a spectrophotometer, to draw a standard curve reflecting the optical density of the known volumes, and then to compare the optical density of the amount of dye held in the loop to the curve. Furthermore, this method has a ±20% error.

In addition to the Evans Blue Dye method, Evergreen Scientific includes a gravimetric method using random urine samples in its quality control protocol. This procedure compares the tare weight and gross weight of the loop using an analytical balance. The difference between these two measures is the weight of the urine picked up by the loop. Precise physical measurements of the loop's inside diameter and thickness are also taken.

Many laboratory technicians, however, generally do not have the time or the inclination to validate loop calibration using either of these methods, yet they still prefer, and in some clinical studies such as urine cultures even require, some confirmation of loop accuracy.

One recent method approved by the FDA has provided technicians with a fast, simple way to validate calibration using two drill bits, each of slightly different size. These drill bits have known, fixed diameters that are resistant to damage. A loop of the proper diameter, and theoretically of the proper volume as well, will fit over a smaller bit but not over a larger one. Thus, by using drill bits of very slightly different sizes, it is possible to establish a narrow range of tolerance for the diameter of a loop. For example, a properly calibrated 1μl loop (a standard size) has an inside diameter of 1.45±0.06 mm (0.057±0.002 inches) and will fit over the end of a #54 drill bit but not over a #53 drill bit.

The drill bit method, however, does not measure the thickness of the loop, a dimension which also affects the volume held and delivered by the loop. Indeed, when using the gravimetric method, Evergreen found that increasing the thickness of the loop was highly correlated with increments of the loop's volume.

SUMMARY OF THE INVENTION

The present invention overcomes the disadvantages of the prior art by combining in one device a means to verify both the inner diameter and the thickness of the loop. The device is particularly useful with disposable inoculating loops which were impractical to validate by most end-users. Validation by any of the above-described means necessarily involves rendering the loops used non-sterile and therefore unusable. Evergreen includes not only the invention described, but extra loops from the same production lot in each of its selling units strictly for the purpose of validation.

The device is a gauge which includes first and second insertion members (comparable to the FDA drill bits) to check the inner diameter of a loop and first and second slots to check the thickness of the loop. A loop is validated if its fits over the smaller insertion member but not the larger and if it fits sideways into the larger slot but not the smaller. Accordingly, the gauge disclosed herein performs the dual function of verifying the inner diameter and the thickness of the loop. The use of this gauge is dependable, yet still simple and fast.

In the preferred embodiment, the gauge has a handle with an octagonal cross section for easy manipulation. The loop insertion members are preferably cylinder-shaped and placed at either end of the gauge. Slots are also placed at either end of the gauge, one adjacent to each insertion member. Preferably, one end of the device is designated the "pass" or "GO" end, i.e., a properly calibrated loop will fit over this side's cylindrical member and into its slot. The other end of the device is designated the "fail" or "NO GO" end, i.e., a properly calibrated loop will not fit over the end of this side's cylindrical member nor into its slot. The gauge itself is imprinted with the words "GO" at one end and "NO GO" at the other. In addition, the colors green and red are used to designate the pass and fail ends, respectively.

BRIEF DESCRIPTION OF THE DRAWINGS

FIG. 1 is an isometric view of a preferred embodiment of the invention.

FIG. 2 is an end view of the device shown in FIG. 1.

FIG. 3 is a top view of the device shown in FIG. 1.

FIG. 4 is a bottom view of the device shown in FIG. 1.

FIG. 5 is an elevational view of the device shown in FIG. 1.

FIG. 6 is a cross sectional view of FIG. 4 taken along line 6—6.

DETAILED DESCRIPTION

While the invention will be exemplified by reference to a detailed illustrative embodiment, the invention in general and certain aspects in particular, are broad in scope, for example, the use of a single integral device to perform the dual function of validating the calibration of the inner diameter and the thickness of a loop. Consequently, the specific structural and functional details disclosed herein are merely representative and are deemed to afford the best embodiments known at this time to provide a basis for the claims which define the scope of the present invention.

A gauge embodying the features of the present invention is shown in FIGS. 1-6, generally at 10. The device may be injection molded with a thermoplastic polymer in one piece.

The gauge 10 has a long handle 12 which in the present embodiment has an octagonal cross section with a top face 14 and side faces 15 for easy handling and manipulation. Each end of the handle 12 has a tapered portion 16 that terminates in a shoulder 18. A first insertion member 20 is integral to one shoulder and a second insertion member 22 is integral to the other shoulder.

Each insertion member 20, 22 preferably has a cylindrical shape coaxial with the longitudinal axis of the octagonal handle 12. For reasons explained previously, the diameter of one insertion member must be slightly different than the diameter of the other insertion member. In FIGS. 1-6, the outside diameter of insertion member 22 is slightly larger than the outside diameter of insertion member 20.

The purpose of the insertion members is to validate the calibration of the inner diameter of a loop. A technician will validate the loop by attempting to pass the loop opening over each insertion member in the longitudinal direction. The inner diameter of the loop is validated if the loop passes over the smaller insertion member 20, but does not pass over the larger insertion member 22. Although cylindrical insertion members are shown in the preferred embodiment, any shape may be used provided a maximum cross-sectional dimension of the insertion member over which the loop must pass is determined. For example, the maximum dimension of an insertion member having a square cross section would be from one corner to the opposite corner of the cross section.

The accuracy of the calibration of the inner diameter of the loop depends on the difference in size of the two diameters used for the cylindrical insertion members. Satisfactory results in validating a $1\mu l$ loop having an inner diameter of 0.057 inches have occurred using a gauge having one insertion member with a $0.055 \pm 0.0005$ inches outside diameter and the other insertion member having a $0.0595 \pm 0.0005$ inches outside diameter. Dimensioning the insertion members of the gauge within the above tolerances is achievable through standard injection molding procedures.

Referring to FIGS. 4 and 5, a first slot 26 is shown formed laterally through a bottom face 30 of the handle 12. A second slot 28 is also shown formed laterally into the handle 12 through the bottom face 30. Preferably, the slot is U-shaped when viewed from the side (as in FIG. 5) with straight and parallel sides 32. The length and depth of the slots are dimensioned to allow a sufficient portion of a loop to be inserted sideways into the slot; if one half of the loop is insertable, then the entire loop thickness can be validated by reversing the loop for a second insertion. As explained previously, the width of one slot must be slightly different than the width of the other slot. In FIGS. 4-5, the width of slot 26 is slightly larger than the width of slot 28.

The purpose of the slots is to verify the thickness of a loop. A technician will validate the loop by attempting to pass the loop sideways into each slot. The width of the loop is validated if the loop passes into the larger slot 26, but does not pass into the smaller slot 28. The accuracy of the calibration of the thickness of the loop depends on the difference in width of the two slots. Satisfactory results in validating a $1\mu l$ loop having a thickness of 0.028 inches are obtained using a gauge having one slot with a $0.026 \pm 0.001$ inches width and the other slot having a $0.030 \pm 0.001$ inches width. Forming the slots into the handle of the gauge within the above tolerances is also achievable through standard injection molding procedures.

In the preferred embodiment, the top face 14 has identifying indicia at each end of the handle. One indicia identifies the pass or "GO" end of the device; on this side, a loop will pass over the insertion member and into the slot, i.e., the outside diameter of the insertion member is small enough to allow the loop opening to pass over the insertion member and the width of the slot is wide enough to allow the loop to pass sideways into the slot. The other end of the device is identified as the fail or "NO GO" end; on this side, the loop will neither pass over the insertion member nor into the slot, i.e., the outside diameter of the insertion member is large enough to prevent the loop opening from passing over it and the width of the slot is small enough to prevent the loop from passing sideways into the slot.

Referring to FIGS. 1 and 3 the identifying indicia 44, 46 are located in depressed portions 40, 42, respectively. For example, indicia 44 in depressed portion 40 is colored green to indicate that this is the pass end of the gauge. The other indicia 46 in depressed portion 42 is colored red to indicate the fail end of the gauge. Words are imprinted onto the top face 14 of the gauge. Adjacent to the green raised portion 44 the word "GO" is printed and adjacent to the red raised portion 46 the word "NO GO" is printed.

The above described device is particularly useful with disposable plastic inoculating loops. The loops often come in packages containing 500 or more loops of the same type and size. A properly dimensioned gauge, as described herein, may be placed in each package together with a small number of sample loops which a technician may validate before using the remaining bulk in the package.

To utilize the gauge, a technician simply takes a loop in one hand and the gauge in the other and first attempts to pass the loop opening over one insertion member then the other. If the loop opening fits over only the smaller of the insertion members, then the inner diameter of the loop is validated. The technician then places the gauge on a flat surface such that the top face 14 of the gauge is bearing on the flat surface. The technician then attempts to pass the loop sideways and in a downward direction into each slot. If the loop fits into only the larger of the slots, then the thickness of the loop is also validated and the technician may have some assurance that the package of loops has been properly calibrated. Additional loops can be checked as the technician sees fit.

It should be evident that the gauge disclosed herein describes an easy and accurate method for validating the inner diameter and thickness of a loop that is particularly useful with disposable plastic inoculating loops. Although the invention herein has been described with reference to particular embodiments, it is to be understood that these embodiments merely illustrate the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A gauge for validating the volume of liquid contained by an inoculating loop by measuring the inside diameter and thickness of the loop, comprising:
   a handle,
   first and second cylindrical insertion members integral to said handle, the maximum cross-sectional dimension of said first insertion member being slightly different than the maximum cross-sectional dimension of said second insertion member for defining a calibration tolerance for the inner diameter of the loop to be validated by attempted insertion of said members into said loop, and said handle defining first and second slots, each slot having a predetermined width, the width of said first slot being slightly different than the width of said second slot for defining a calibration tolerance for the thickness of the loop to be validated by attempted insertion of said loop into said slots whereby when said inner diameter and thickness are within the calibrated tolerances, said loop is conformed to deliver a precise volume of liquid.

2. The gauge of claim 1 wherein said slots have straight and parallel sides.

3. The gauge of claim 2 wherein said handle has two ends and said first and second insertion members are formed on opposite ends of said handle.

4. The gauge of claim 3 wherein said handle extends longitudinally, said insertion members extend outwardly in said longitudinal direction from opposite ends of said handle and said slots are defined normal to said longitudinal direction.

5. The gauge of claim 4 wherein said handle has an octagonal cross section.

6. The gauge of claim 1 wherein said first insertion member has a smaller maximum cross-sectional dimension than said second insertion member and said first slot has a larger width than said second slot.

7. The gauge of claim 6 wherein said handle has first and second indicia that are different, said first indicia, first insertion member and first slot positioned at one end of the handle and said second indicia, second insertion member and second slot positioned at the other end of the handle.

8. The gauge of claim 7 wherein said handle has first and second depressed portions in which said first and second indicia are located respectively.

9. The gauge of claim 8 wherein said slots and said indicia are on opposite sides of said handle.

10. A gauge for validating the volume of liquid to be delivered by an inoculating loop by measuring the inside and thickness of the loop, comprising:
a rod-like handle having first and second ends, a top face and a bottom face, a first slot defined in said bottom face adjacent the first end and a second slot defined in said bottom face adjacent the second end, each of said slots having straight and parallel sides;

a first cylindrical member integral to and extending outward coaxially from the first end of the handle and a second cylindrical member integral to and extending outward coaxially from the second end of the handle;

said first cylindrical member having a slightly smaller outside diameter than said second cylindrical member for validating the inner diameter of a loop by attempted insertion of said members into said loop and said first slot having a slightly larger width than said second slot for validating the thickness of a loop by attempted insertion of said loop sideways into said slots; and said handle having first and second indicia that are different on the top face of the handle, said first indicia disposed adjacent the first end on the handle and said second indicia disposed adjacent the second end of the handle whereby when said inner diameter and thickness are within the calibrated tolerances, said loop is confirmed to deliver a precise volume of liquid.

11. A gauge for validating the volume liquid contained by a loop by measuring the inside diameter and thickness of the loop, comprising:
a handle,
inner diameter gauge members consisting of two cylindrical insertion members integral to said handle, the maximum crosssectional dimension of a first of said insertion members being slightly different than the maximum cross-sectional dimension of a second of said insertion members for defining a calibration tolerance for the inner diameter of the loop to be validated by attempted insertion of said insertion members into said loop, and said handle defining thickness gauge measuring means consisting of two slots, each slot having a predetermined width, the width of a first of said slots being slightly different than the width of a second of said slots for defining a calibration tolerance for the thickness of the loop to be validated by attempted insertion of said loop into said slots whereby when said inner diameter and thickness are within the calibrated tolerances, said loop is confirmed to deliver a precise volume of liquid.

* * * * *

UNITED STATES PATENT AND TRADEMARK OFFICE
CERTIFICATE OF CORRECTION

PATENT NO. : 5,131,158
DATED : July 21, 1992
INVENTOR(S) : Johnson N.S. Wong

It is certified that error appears in the above-identified patent and that said Letters Patent is hereby corrected as shown below:

Column 2, line 11, delete "its" and insert --it--.

Column 5, line 9, delete "conformed" and insert "confirmed".

Signed and Sealed this

Seventh Day of September, 1993

Attest:

BRUCE LEHMAN

Attesting Officer

Commissioner of Patents and Trademarks